United States Patent
Norris et al.

(10) Patent No.: US 10,025,084 B2
(45) Date of Patent: Jul. 17, 2018

(54) AUTOFOCUS ALGORITHM FOR MICROSCOPY SYSTEM BASED ON CROSS-CORRELATION

(71) Applicant: BioTek Instruments, Inc., Winooski, VT (US)

(72) Inventors: Ben Norris, Williston, VT (US); Ben Knight, Shelburne, VT (US); James Piette, Winooski, VT (US); Joe Tobey, Essex, VT (US); Eddy Delpierre, La Chapelle Gauthier (FR)

(73) Assignee: BIOTEK INSTRUMENTS, INC., Winooski, VT (US)

( * ) Notice: Subject to any disclaimer, the term of this patent is extended or adjusted under 35 U.S.C. 154(b) by 160 days.

(21) Appl. No.: 14/878,655

(22) Filed: Oct. 8, 2015

(65) Prior Publication Data
US 2016/0131887 A1    May 12, 2016

Related U.S. Application Data

(60) Provisional application No. 62/061,381, filed on Oct. 8, 2014.

(51) Int. Cl.
*G02B 21/24* (2006.01)
*H04N 5/232* (2006.01)
*G02B 7/38* (2006.01)

(52) U.S. Cl.
CPC ............. *G02B 21/244* (2013.01); *G02B 7/38* (2013.01); *H04N 5/23212* (2013.01)

(58) Field of Classification Search
CPC ..... G02B 21/244; G02B 7/38; H04N 5/23212
See application file for complete search history.

(56) References Cited

U.S. PATENT DOCUMENTS

| | | | | |
|---|---|---|---|---|
| 4,740,678 A | * | 4/1988 | Horikawa | G02B 7/34 250/201.8 |
| 4,897,537 A | * | 1/1990 | Miyamoto | G02B 21/244 250/201.3 |
| 5,589,909 A | * | 12/1996 | Kusaka | G02B 7/346 396/128 |
| 5,675,141 A | * | 10/1997 | Kukihara | G02B 21/244 250/201.2 |
| 2003/0000597 A1 | * | 1/2003 | Ganz | B01L 9/523 141/130 |
| 2015/0009559 A1 | * | 1/2015 | Brooker | G02B 21/245 359/389 |

OTHER PUBLICATIONS

Wiseman et al.; Two-photon image correlation spectroscopy and image cross-correlation spectroscopy; May 2000; Journal of Microscopy; vol. 200; pp. 14-25.*
Mitra, Sanjit K., Digital Signal Processing: a Computer-Based Approach, Third Edition, 2006, pp. 100-105.

* cited by examiner

*Primary Examiner* — Peter D Le
(74) *Attorney, Agent, or Firm* — Sughrue Mion, PLLC

(57) ABSTRACT

Optimized automatic focusing of a microscope objective based on a cross correlation between a representative focus metric scan and a focus metric scan of a sample to be imaged.

10 Claims, 11 Drawing Sheets

AUTOFOCUS ALGORITHM FOR MICROSCOPY SYSTEM BASED ON CROSS-CORRELATION

CROSS-REFERENCE TO RELATED PATENT APPLICATION

This application is a non-provisional application of U.S. Provisional Application No. 62/061,381 filed on Oct. 8, 2014, in the U.S. Patent and Trademark Office, the disclosure of which is incorporated herein by reference in its entirety.

1. Field

Methods and apparatuses consistent with embodiments of the present application relate to microscopy, and more particularly to methods and apparatuses implementing an autofocus algorithm for a microscopy system based on cross-correlation.

2. Description of Related Art

Cell biology increasingly relies on fully automated systems to collect imaging data from multiple samples. The samples are often placed in microplates having any array of microplate wells, such as an array of 96 or 384 wells arranged in rows and columns.

High magnification microscopy methods are commonly used to observe and record images of cells in samples provided in one or more microplate wells. The images of the cells may be obtained using one or more of various modes, such as a fluorescence mode, bright field mode, or a phase contrast mode. Accordingly, it is desirable for researchers to be able to monitor a cell growth process over time, or observe cells reaction to stimulus over time, for example according to one or more images captured over time according to the one or more of the cell imaging modes.

To obtain good microscopy images, a microscope objective should be properly focused on the sample. Conventionally, two methods of focusing are deployed in the automated systems: position-based sensing and image-based sensing.

Position-based sensing employs complex additional to imaging hardware to detect a reference reflecting surface. For example, a bottom of a microplate well in a microplate may be detected as the reference reflecting surface. Once the reference surface is determined, an image is taken at an offset from this surface. Typically, the offset will be fixed for the duration of the experiment to provide imaging constancy. However, if cell distribution in the Z-axis direction with respect to the imaging hardware is not the same for each microwell, the constant offset may result in some images being out of focus for the objects, e.g., cells, of interest.

In image-based autofocus, a series of images is taken at various Z-axis positions of the imaging hardware, e.g., microscope objective, relative to the reference reflecting surface, e.g., bottom of the microwell, and a best image is selected based on sharpness of the features of interest in the series of images. No additional hardware is required to implement image-based autofocusing in an automated system, thus making the an image-based autofocus system more robust and less expensive. However, image-based autofocus systems suffer from additional time required to capture the series of images, which also exposes the sample to additional light.

In a typical image-based autofocus process, each image taken along the Z-axis is assigned a focus score based on a selected image evaluation metric or focus measure. For example, "A comparison of Different Focus Functions for Use in Autofocus Algorithms," *Cytometry*, 6:81-91, 1985 by Groen et al. describes various possible metrics, and concludes that the gradient metric and intensity variance provide the best results.

FIG. 1 illustrates a conventional image-based autofocus process.

As illustrated in FIG. 1, multiple images are captured around a Z-axis position specified by the user as the "best guess" for focus. In FIG. 1, the Z-axis position is position 4. A focus measure is calculated for the image captured at each position, and an the image-based autofocus process algorithmically determines the best Z position, namely a position that results in maximum value for the focus measure selected for autofocus.

Some auto-focus algorithms collect multiple equally spaced images, and construct a curve correlating the focus measure to the Z-axis position. The image having the maximum focus measure is selected. Though this is a very robust method, the processing is slow.

Alternatively, some auto-focus methods consider only a few images taken along the Z-axis, and the best Z-axis position is mathematically estimated to be the "best guess" position. Then, subsequent images are captured around this "best guess" position, mathematical estimation is performed on the subsequent images, to thereby refine the "best guess" position. The procedure is iteratively repeated until no significant improvement in focus measure is observed.

The above method may exhibit improved speed, for example if the focus measure curve is unimodal (i.e., having a single maximum), fairly sharp, and includes low noise, as represented in FIG. 1. However, the total time and number of images required to reach an optimal focus is somewhat unpredictable, for example due to a poor initial selection.

FIG. 2 illustrates a conventional image-based autofocus process.

As noted above, when working with cells, two imaging techniques and two methods of illumination are commonly employed: fluorescence imaging and bright field imaging. Curve A in FIG. 2 representatively illustrates a focus curve using fluorescence imaging, and curve B in FIG. 2 representatively illustrates a focus curve using bright field imaging.

In fluorescence imaging, the object is illuminated with a short wavelength (excitation) and imaged at a longer wavelength (emission). Because only a few objects that have absorbed a fluorescence dye appear on a resulting image, fluorescence images tend to show objects with well-defined, sharp edges. As a result, a focus measure curve tends to be smooth, and thereby determining the best focus position using image-based autofocusing may be easily performed.

Fluorescence based imaging, however, requires staining of cells. Therefore, fluorescence-based imaging may not be preferred for the imaging of live cells.

Conversely, when imaging live cells, bright field microscopy or phase contrast microscopy may be employed, in which the cells remain unstained in their original state without alterations. In bright field microscopy, an image is resultant from the absorbance (bright field) or phase shift (phase contrast) in the objects (e.g., cells) of interest. In contrast, the cells may be damaged by fluorescence dyes during cell preparation of fluorescence-based imaging. Moreover, during fluorescence-based imaging, cells are illuminated under more intense light exposure, and the lengthened wavelength of bright field imaging is less damaging to cells. Images obtained using bright field imaging, however, may be less sharp than those obtained using fluorescence-based imaging, and the focus measurement curves may be less well-defined as multiple peaks are often present in the focus measure curve and the curve itself may be noisy, as illustrated in FIG. 2.

Three is an increasing interest in automated live cell bright field imaging. Accordingly, bright field illumination may be deployed for autofocus even if a final image is taken in fluorescence mode, and the need to be able to reliably focus in bright field correspondingly increases.

Various methods have been suggested.

EP 1190271 (B1) describes an autofocus method that uses a digital gradient filter with a mathematical smoothing function, and U.S. Pub. 2013/0100334 calculates the best focus position based on minimizing a noise level of the focus measure curve. Both methods attempt to mathematically smooth the noisy focus measure curve to derive the best focus position.

In bright field imaging, the shapes of focus measure curves vary depending on cells under study and objective used. Thus, it may be difficult to assure that a mathematical smoothing algorithm will reliably converge on the best focus position over long periods of time required for sustained cell studies. For example, the bright field focus measure curve B illustrated in FIG. 2 represents a focus measure curve that will be challenging for existing methods to use for a reliable image-based autofocus process.

It is therefore desirable to find a solution that will allow robust autofocus in the bright field independent of the unimodality and noise level of the focus curve.

SUMMARY

Aspects of embodiments of the present application relate to a method for autofocusing an automated microscopy system using cross correlation of the focus measure curve.

According to an aspect of an embodiment, there is provided a method of automatically focusing a microscope objective, the method including determining a focus position between the microscope objective and a reference microwell at a reference position on a microplate, generating an original focus metric scan based on the focus position, generating a current focus metric scan of a microwell to be imaged on the microplate using the focus position, performing cross correlation between the original focus metric scan and the current focus metric scan, and determining whether to image a sample in the microwell to be imaged using the focus of the microscope objective based on a result of the cross correlation.

BRIEF DESCRIPTION OF THE DRAWINGS

The above and/or other aspects will become apparent and more readily appreciated from the following description of the embodiments, taken in conjunction with the accompanying drawings in which.

DETAILED DESCRIPTION OF THE EMBODIMENTS

In signal processing, cross-correlation is a measure of how well two y(Z) functions fit together when one function is offset from another along a horizontal (Z) axis. If both functions are identical, the cross correlation is at a maximum when the two functions align perfectly.

Figure 1:
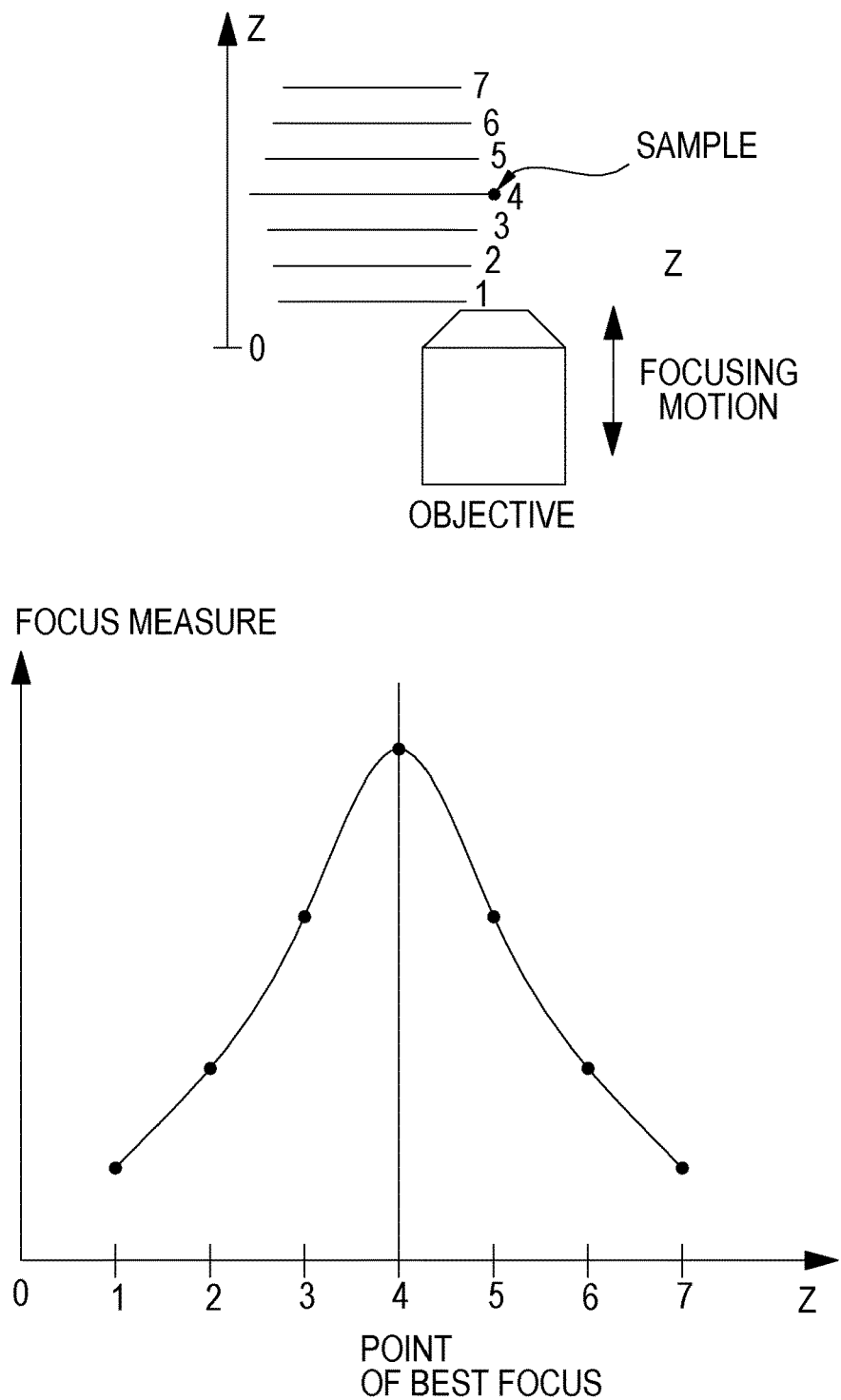
FIG. 1 illustrates a conventional image-based autofocus process.
Figure 2:
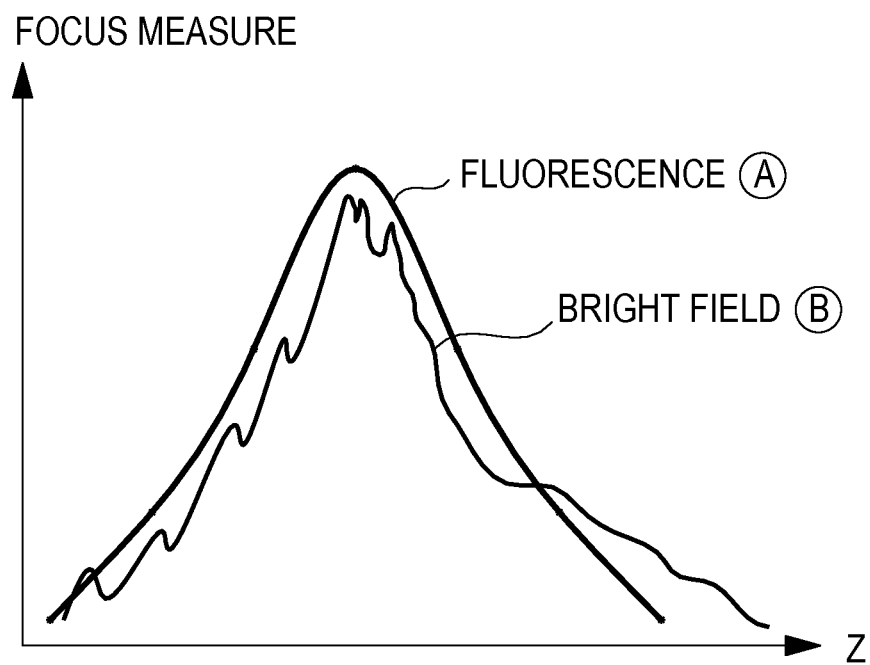
FIG. 2 illustrates a conventional image-based autofocus process.
Figure 3:
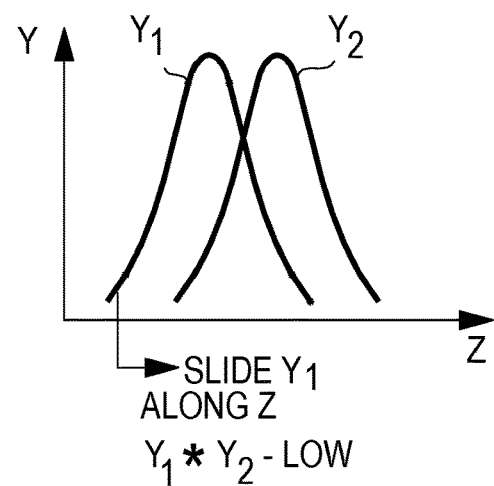
FIGS. 3 and 4 illustrate relative positions of functions and relative magnitude of cross correlations according to an embodiment of the present application.
Figure 3:
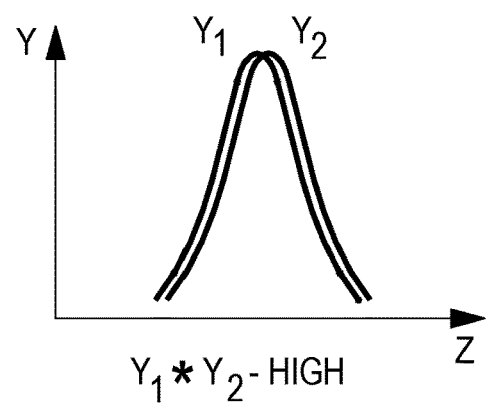
Figure 3:
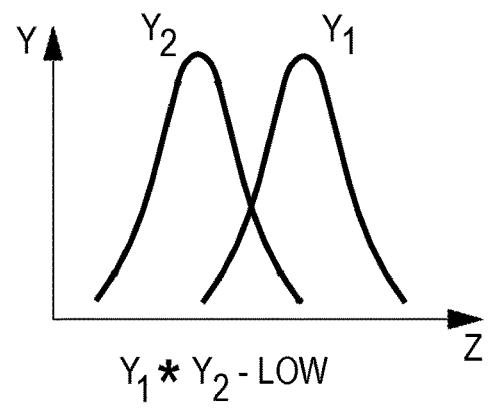
Figure 4:
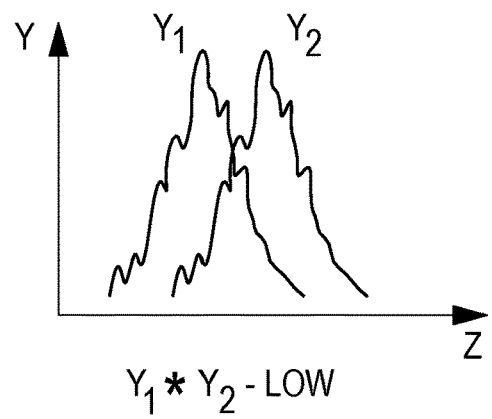
Figure 4:
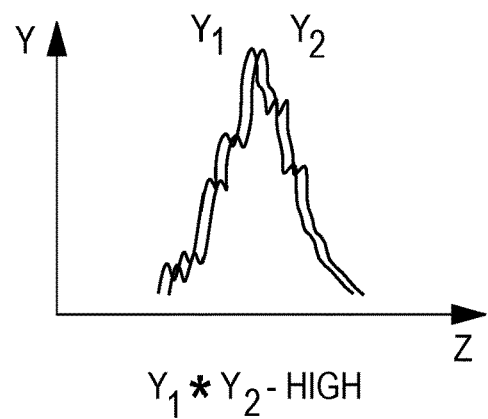
Figure 4:
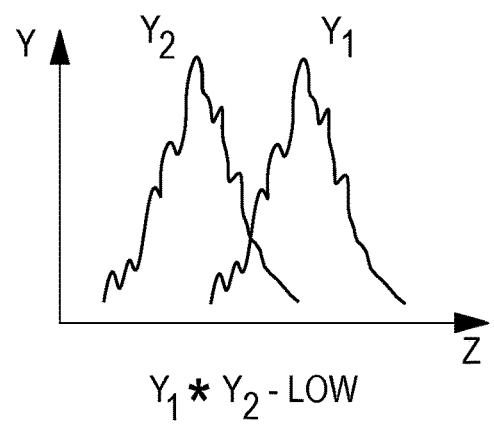

FIGS. 3 and 4 illustrate relative positions of functions and relative magnitude of cross correlations.

As illustrated in FIG. 3, a first function Y1 and a second function Y2 may be mapped to the vertical (Y) axis and horizontal (Z) axis.

In the first illustrated example, the first function Y1 is offset from the second function Y2 along the Z-axis. Accordingly, even though the first function Y1 and the second function Y2 present similar curves, there is low cross correlation due to the offset along the Z-axis. Similarly, in the third illustrated example, the first function Y1 is offset from the second function Y2 along the Z-axis. Again, despite the similarity between the first function Y1 and the second function Y2, there is low cross correlation due to the offset along the Z-axis.

On the other hand, in the second illustrated example of FIG. 3, there is little offset between the first function Y1 and the second function Y2 along the Z-axis. Accordingly, there is high cross correlation between the first function Y1 and the second function Y2.

As illustrated in FIG. 4, a first function Y1 and a second function Y2 may again be mapped to the vertical (Y) axis and horizontal (Z) axis.

Even if noise is present, the cross correlation reaches a maximum value when the underlying functions are in alignment along the Z-axis, as shown in FIG. 4.

Aligning functions using cross correlation is independent of the relative smoothness of the functions, for example the smooth functions of FIG. 3 and the noisy functions of FIG. 4, being investigated. In fact, if a spike is present in both functions, cross correlation alignment may apply high weight to this spike during the aligning process. Thus, if a focus measure curve is highly irregular, cross correlation may be a reliable method to align two focus measures relative to each other, thereby enabling determination of a Z-offset required for placing both curves in alignment with each other.

In FIG. 4, the first function Y1 and the second function Y2 represent focus measure curves obtained in bright field imaging. It was observed that, over time, the focus measure curve for a particular well remains predominantly fixed in shape. Noise may be introduced over time, but the shape of the focus measure curve is easily recognizable owing to its relative stability.

Figure 5:
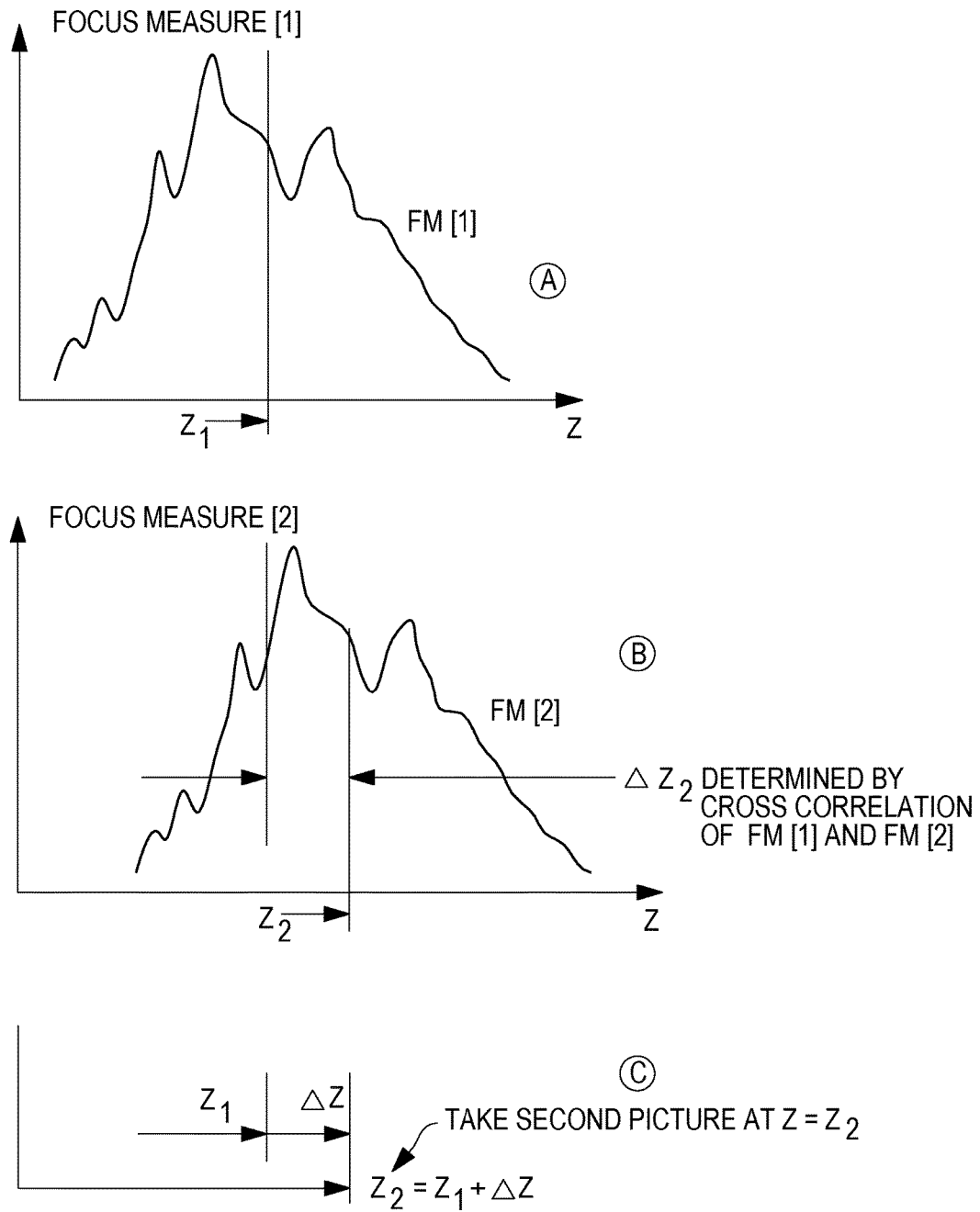
FIG. 5 illustrates a bright filed focus measure curve according to an embodiment of the present application.

FIG. 5 illustrates a bright filed focus measure curve.

Curve A in FIG. 5 illustrates the first image in a series [1] is taken at position $Z_1$ relative to Z-axis home. The focus measure curve FM[1] was determined relative to the same Z home locations as $Z_1$. The image [1] was deemed a well-focused image. Over time, the relative position of a sample and an objective to Z home may change due to drift.

Curve B in FIG. 5 illustrates the second image [2] in a series establishing a new focus measure curve FM[2]. Relative to focus measure curve FM[1], the focus measure curve FM[2] is slightly shifted in the Z-axis direction. Because the focus measure curve FM[1] is collected in the vicinity of $Z_1$, if the focus measure curve FM[2] for the second image [2] is shifted relative to the focus measure curve FM[1] by delta $Z_2$, the best location $Z_2$ for capturing the image [2] will be the location $Z_1$ at which first image was captured, but shifted by the same delta $Z_2$, as illustrated in graph C of FIG. 5.

Tracking the sample and autofocus is thus reduced to determining an offset delta Z between two graphs of fairly complex, but very similar shapes, namely the focus measure curves. The cross correlation between focus measure curves is used to find this offset.

In addition to making it possible to autofocus very accurately and robustly on bright field images, this technique may be applied to fluorescent images. It has been observed that this method of autofocus increases the accuracy and repeatability of fluorescent autofocus by nearly an order of magnitude. The focus metric scan is relatively flat at the peak because the object being viewed has a finite thickness and the objective itself has a finite depth of field. So, as the object is passed through the depth of field of the objective, different parts of the object will come into and out of focus.

Repeatability of traditional autofocus algorithms is limited by the thickness of the object and the depth of field of the objective. However, when using the cross correlation technique, the entire focus measure metric curve is applied to detect a repeatable location. The information from the entire curve therefore indicates where to look for best focus, rather than simply applying a peak value.

Another benefit of the cross correlation autofocus technique is the user selection of focus on a specific part of an object that has a finite thickness. In other words, as positioning through the Z-planes, different parts of the object are in focus. If, for example, the user would like to autofocus on the bottom part of an object, such focusing is difficult given traditional image-based autofocus. On the other hand, the embodiment of the present application employs more than just the top of the focus metric scan to determine the location, namely the entire scan, thus it is possible to focus on a particular region of interest.

Figure 7:
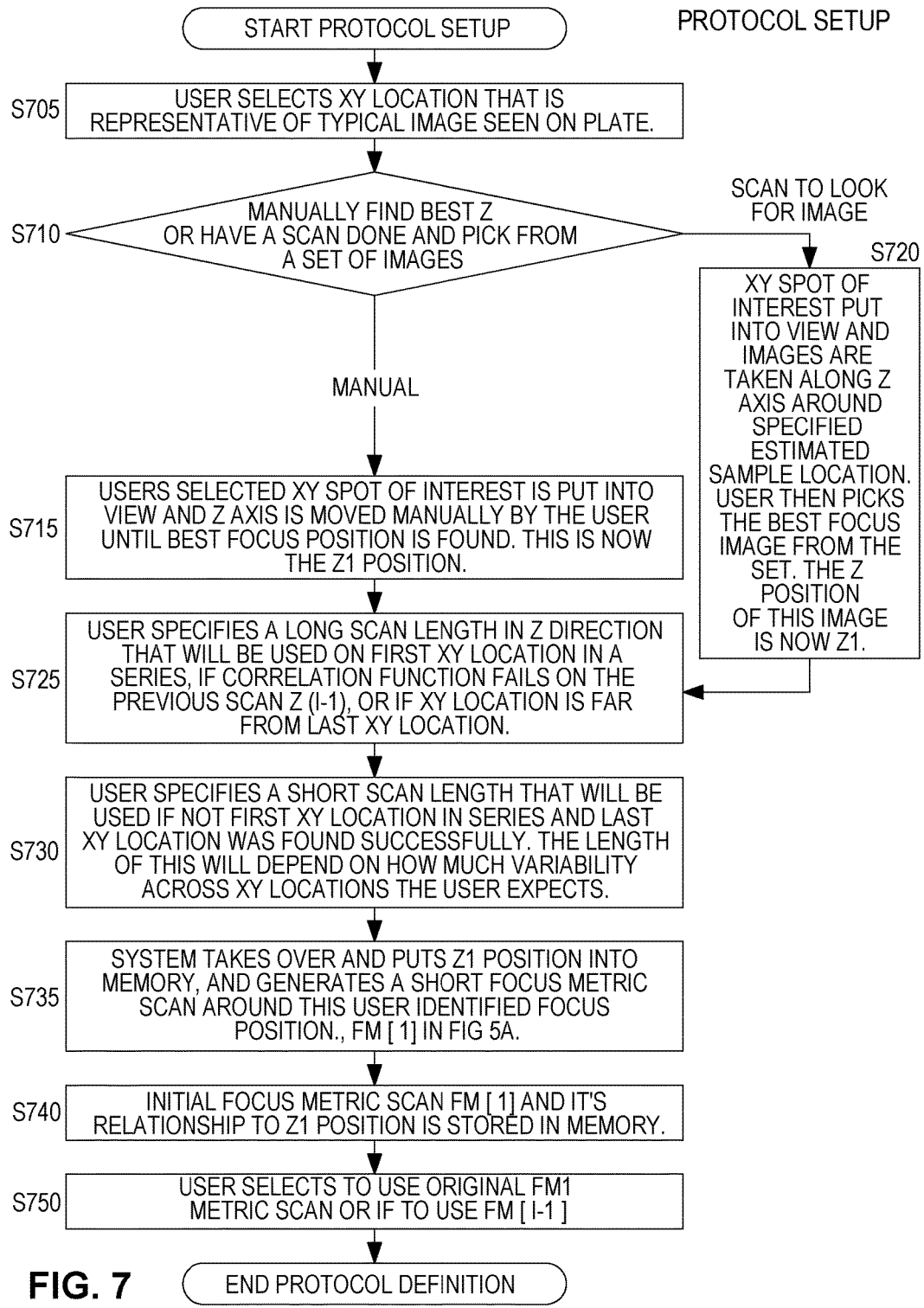
FIG. 7 illustrates protocol setup for an imaging scenario according to an embodiment of the present application.
Figure 8:
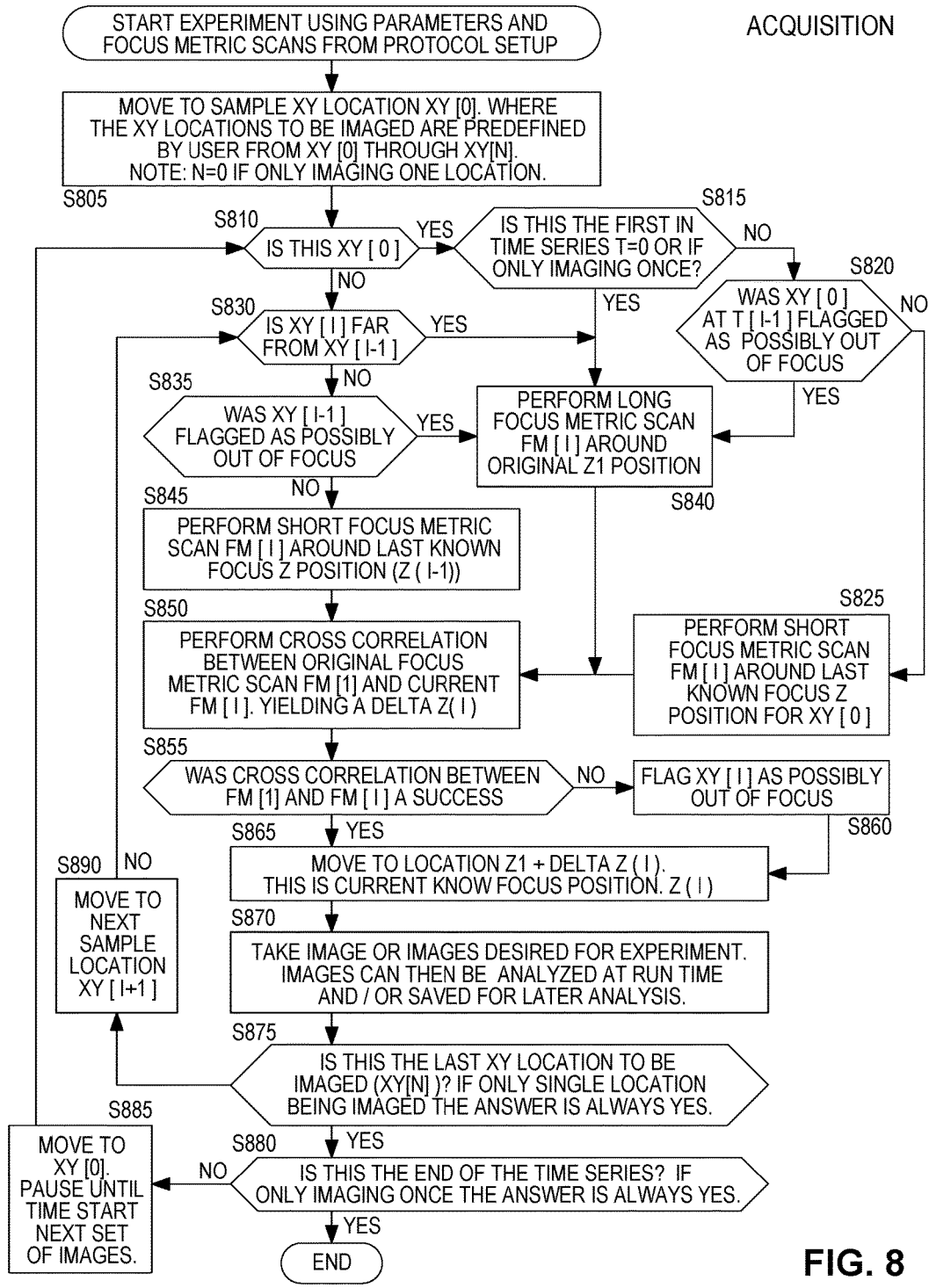
FIG. 8 illustrates the acquisition for the imaging scenario based on the protocol setup of FIG. 7 according to an embodiment of the present application.

FIGS. 7 and 8 illustrate an imaging scenario in which a single location is imaged over time. In FIG. 7, the protocol setup for the imaging scenario is provided; and FIG. 8 illustrates the acquisition for the imaging scenario based on the protocol setup of FIG. 7.

In step S705, a user selects an XY location that is representative of a typical image seen on a microplate. The XY location may correspond to a location of a microwell on the microplate in which a sample is disposed.

In step S710, an initial focus is determined, which may be performed either manually by a user in step S715 or automatically by the autofocus system performing a scan of images and selection from a set of images having a best initial focus in step S720. In step S715, the user selected XY location of interest is brought into view, and the user may adjust the Z axis until a desired best focus is determined as an initial focus. With respect to FIG. 5, this location may correspond to the location Z1. Alternatively, in step S720, the XY location of interest is brought into view and images are captured along the Z-axis around a the specified estimated sample location. Either the user or the system may select the best focus image from the set of images, and the Z-axis focus position of the image is initially set. Again, with respect to FIG. 5, this location may correspond to the location Z1. The focus matrix is built from images around the selected image.

In step S725, the user may specify a long scan length in the Z-axis direction that will be used on the XY location in a series, if the cross correlation function falls on a previous scan Z(i−1), or if the XY location is distant from the previous XY location.

In step S730, the user may specify a short scan length that will be used if the XY location is not the first location in a series and a last XY location was found. The length of the short scan length may vary based on the variability across XY locations.

In step S735, the autofocus system may record the position $Z_1$ for the identified focus. Additional user input may no longer be required. A focus measure scan around the identified focus position is generated, for example FM[1] as illustrated in FIG. 5.

In step S740, the initial focus metric scan FM[1] and its relationship to the position Z1 may be stored in memory.

In step S750, a user may select to employ the original metric scan FM[1] or another metric scan FM(i−1).

The protocol setup procedure is now complete, and an experiment may be conducted using the parameters and focus metrics scans determined during the protocol setup, as illustrated in FIG. 8.

In step S805, imaging optics are positioned to an initial XY location XY[0]. The XY locations to be imaged XY[0]-[N] may be predefined by the user.

In step S810, it is determined whether the XY location is an initial XY location XY[0].

If the XY location is an initial XY location XY[0], then it is determined in step S815 whether imaging is first in time (t=0) of a series or whether imaging is to be performed only once.

If it is determined that imaging is not first in time of a series or that imaging is to be performed more than once, in step S820 it is determined whether a previous image at time t(i−1) was flagged as out of focus.

If the image is not flagged as out of focus, in step S825 a short focus metric scan FM[i] is performed around the last known focus position for the XY[0] position.

If the XY location is not an initial XY location XY[0] in step S810, then it is determined whether the location XY[i] is far from a previous location XY[i−1] in step S830.

If it is determined that the location XY[i] is not far from a previous location XY[i−1] in step S830, then in step S835 it is determined whether the previous XY location XY[i−1] was flagged as out of focus.

If it is determined that the previous XY location XY[i−1] was flagged as out of focus in step S835, or if it is determined in step S815 that imaging is first in time (t=0) of a series or whether imaging is to be performed only once in step S815, or if it is determined that a previous image at time t(i−1) was flagged as out of focus in step S820, then in step S840 it is determined to perform a long focus metric scan FM[i] around the original position $Z_1$.

If it is determined that the previous XY location XY[i−1] was not flagged as out of focus in step S835, then it is determined to perform a short focus metric scan FM[i] around the last known focus Z position Z(i−1) in step S845.

Once a long focus metric scan is performed in step S840 or a short focus metric scan is performed in step S825 or step S845, then a cross correlation is performed between an original focus metric scan FM[1] and the current focus metric scan FM[i] in step S850.

In step S855, it is determined whether the cross correlation between the original focus metric scan FM[1] and the current focus metric scan FM[i] is high.

If the cross correlation between the original focus metric scan FM[1] and the current focus metric scan FM[i] is low, then in step S860 the position XY[i] is flagged as out of focus, and in step S865 the focus location is moved to a position of $Z_1$ offset by delta $Z_1$ determined by the cross correlation.

During a long term imaging process for each new image [i] of the location of interest, the system generates a focus measure curve. With respect to FIG. 5, the second focus measure curve is FM[2]. A cross correlation process between a previous focus measure curve and new focus measure curve generates a delta Z[i]. The deviation of this number from zero is due to drift of the system or the sample over time. The objective that was positioned at $Z_1$ for the first image is repositioned by this amount of delta [i] and an image[i] is captured.

The system may cross correlate FM[i] to the very first image of the series [1] or to the latest image [i−1]. In a preferred embodiment, the second method is employed if the focus measure function changes slowly over the time of the experiment.

A way to reduce the effect of the drift of the Z axis on ability to collect valid readings for the focus measure scan is to collect data for the current focus measure FM[i] using the latest found Z[i−1] location for best focus.

All images thus obtained will be taken at the same relative position to the focus measure scans and thus as focused as the very first image.

In step S870, one or more images of the sample are acquired. The images may be analyzed at run time by the imaging system or stored for subsequent analysis.

In step S875, it is determined whether the last XY location to be imaged is the current location XY[i].

If it is determined that the current location XY[i] is the last location, then in step S880 it is determined whether the imaging has reached the end of the time series, and if so the imaging ends.

Alternatively, if the current location XY[i] is not the last location in step S875, or if the imaging has not reached the end of the time series in step S880, then imaging is performed with respect to the next sample location XY[i+1] or to the XY[0], respectively. Imaging is iteratively repeated until completion.

Imaging a single location over time technique is described above and referenced in FIG. 5 may be extended for multiple wells if the next time interval [2] is replaced by the next well [2]. This is confirmed by practice in that shapes of focus matrix curves are very similar for one experiment (i.e., same shape cells across multiple wells). The best focus position for subsequent wells Z[i] is determined relative to the best focus for the first well Z[1] by correcting for Z-axis drift via cross correlation of focus measure curve FM[i] with FM[1] of the first well. It is preferable to use Z[i] position determined for the start of Z[i+1] focus measure scan to reduce the effect of slow drift across the plate that could be due to thermal of mechanical or due to plate non-flatness.

When imaging multiple wells over time (i.e., multiple wells time study), the cross correlation technique to compensate for drift and finding focus in an imaging system may also be deployed in a study of multiple wells imaged over time.

Figure 6:
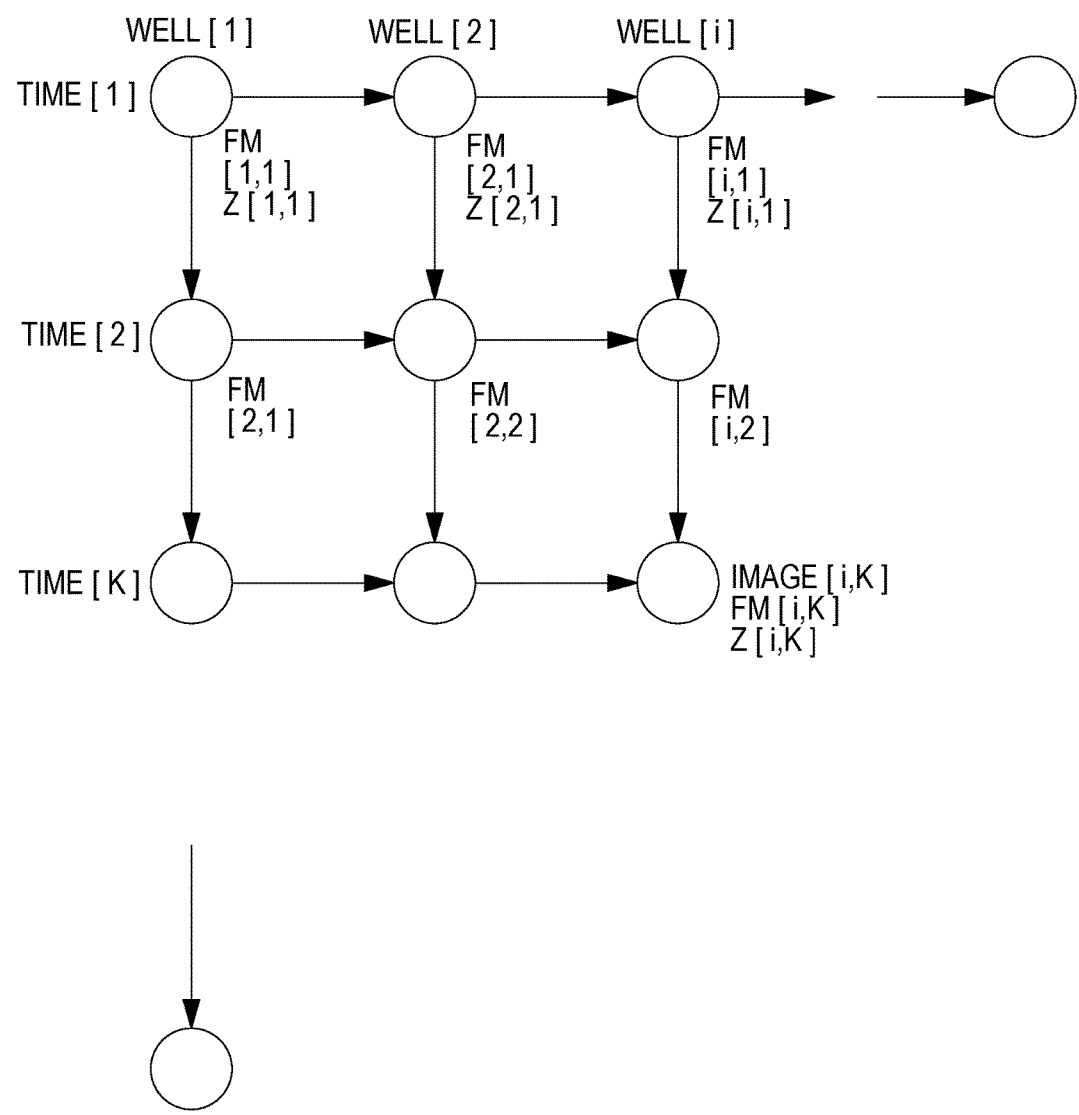
FIG. 6 illustrates one way to arrange the steps and logic of imaging multiple wells over time according to an embodiment of the present application.

FIG. 6 illustrates one way to arrange the steps and logic of imaging multiple wells over time.

The first best focus location Z[1,1] is confirmed by user or via a robust focusing method, even if a very time consuming technique. Then, the focus measure curve FM[1, 1] is established. For all subsequent wells [i] and all subsequent time steps [k] the best focus location Z[i,k] is determined by cross correlating a focus measure curve FM[i,k] with either FM[1,1] in the first time step or with FM[1,1] or FM[i,k−1] (i.e., focus measure of the same well taken at previous time step) and adjusting Z[i,k] accordingly. The starting position Z to collect data for FM[i,k] could be Z[i−1,k] or Z[i,k−1] in order to account for slow drift already compensated for in previous steps.

Cross-correlations are useful for determining the time delay between two signals, e.g., for determining time delays for the propagation of acoustic signals across a microphone array. After calculating the cross-correlation between the two signals, the maximum of the cross-correlation function indicates the point in time at which the signals are best aligned, i.e. the time delay between the two signals is determined by the argument of the maximum, or arg max of the cross-correlation, as in the Equation below:

$$\tau_{delay} = \underset{t}{\operatorname{argmax}}((f * g)(t))$$

In a preferred embodiment, the cross correlation technique is applied to determine a lag in Z height, as opposed to a lag in time. So an analog to the above formula is shown in the Equation below:

$$Z_{Lag} = \operatorname{argmax}((f*g)(z))$$

In the Equation above, the * operator indicates cross correlation.

In the Equation above, f and g are focus metric scans and the location of the max value of the cross correlation represents the difference in height of the f and g focus metric scan. For example, a lag of 0 indicates that the focus position has not changed and a lag of −1 indicates that the g focus metric scan is shifted by 1 increment down (i.e., the point of focus is 1 increment lower in g than if f).

There are multiple ways of implementing the cross correlation in software. One way is to use a series of software loops to perform the following calculation:

$$(FM[1]*FM[i])[n] = \sum_{m=-\infty}^{\infty} FM[1][m] FM[i][m+n]$$

where FM[1] is the initial reference focus metric scan and FM[i] is the new focus metric scan taken at a later time.

Figure 9:
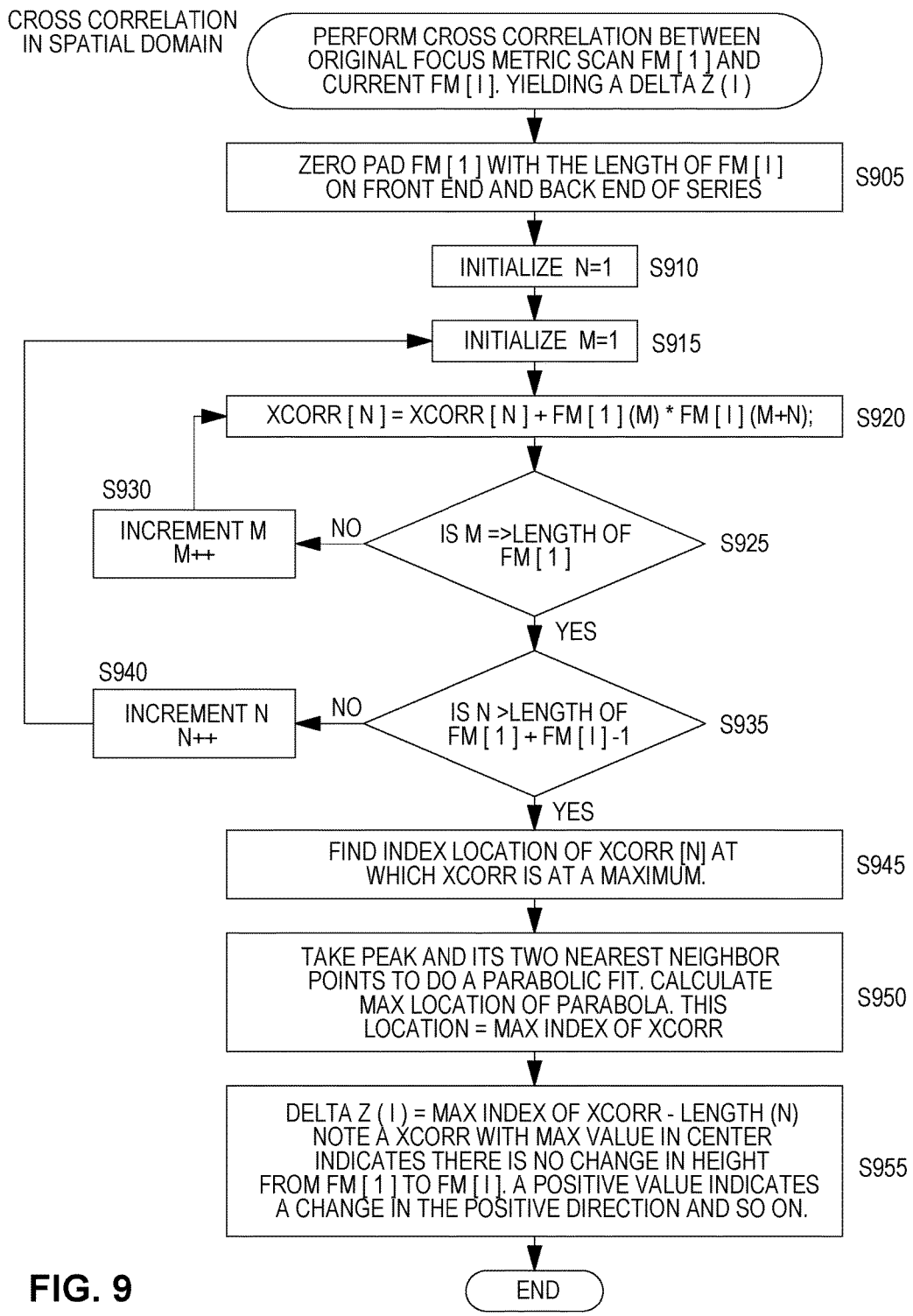
FIG. 9 illustrates a method of performing cross correlation in the spatial domain according to an embodiment of the present application.

FIG. 9 illustrates a method of performing cross correlation in the spatial domain.

As illustrated in FIG. 9, cross correlation may be performed between an original focus metric scan FM[1] and a current focus metric scan FM[i] to determine a delta Z(i).

In step S905, the original focus metric scan FM[1] is zero padded with the length of the current focus metric FM[i] on a front end and a back end of a time series.

In steps S910 and S915, the values of m and n are initialized to 1, as shown in the above Equation.

In step S920, the value xcorr[n] is set based on the initialized values and the cross correlation between the focus metric scans.

In step S925, it is determined whether m is greater than or equal to the length of the original focus metric scan FM[1].

If it is determined that m is not greater than or equal to the length of the original focus metric scan FM[1], then m is incremented in step S930 and xcorr[n] is set in step S920.

If it is determined that m is greater than or equal to the length of the original focus metric scan FM[1], then it is determined whether n is greater than the length of the original focus metric scan FM[1] and the length of the current focus metric FM[i] in step S935.

If n is not greater than the length of the original focus metric scan FM[1] and the length of the current focus metric FM[i] in step S935, then n is incremented in step S940 and the process is iteratively repeated.

If n is greater than the length of the original focus metric scan FM[1] and the length of the current focus metric FM[i] in step S935, then an index location of xcorr[n] at which xcorr is at a maximum is determined in step S945.

In step S950, a peak and two adjacent neighboring points are fitted to a parabola and maximum location of the parabola is determined corresponding to the maximum index of xcorr.

In step S955, a delta Z(i) is determined as the difference between the maximum index of the xcorr and the length of n, where an xcorr with maximum value in a center indicates that there is no change in height from the original focus metric scan FM[1] and the current focus metric FM[i]. Alternatively, a positive value indicates a change in the positive direction.

Figure 10:
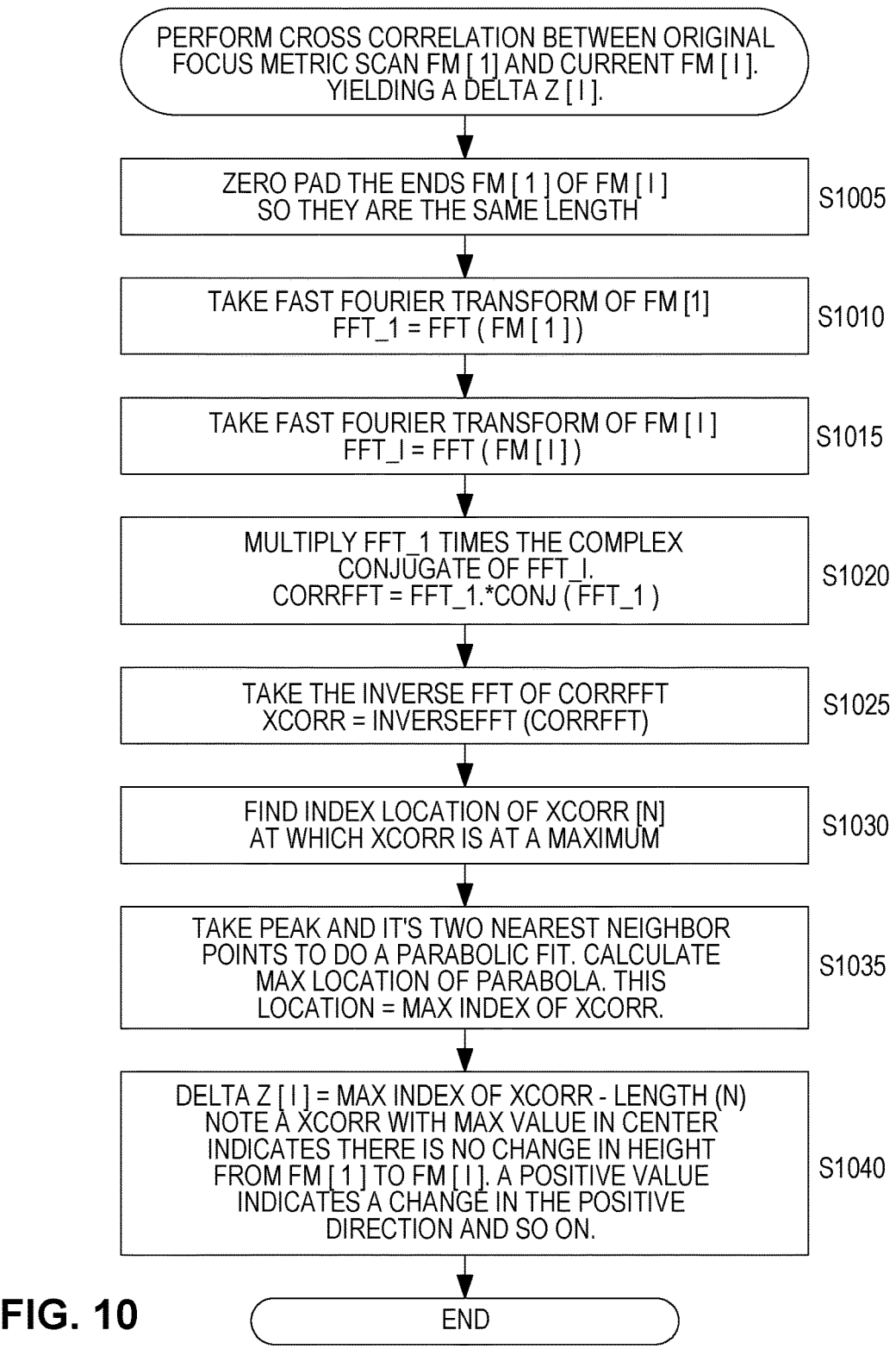
FIG. 10 illustrates a method of performing cross correlation in the frequency domain according to an embodiment of the present application.

FIG. 10 illustrates a method of performing cross correlation.

In an alternative embodiment, cross correlation may be employed in the frequency domain using fast Fourier transform (FFT). Performing cross correlation in the frequency domain may reduce execution time for calculating the cross correlation.

As illustrated in FIG. 10, cross correlation may be performed between an original focus metric scan FM[1] and a current focus metric scan FM[i] to determine a delta Z(i).

In step S1005, the original focus metric scan FM[1] or the current focus metric FM[i] are zero padded, on a front end and/or a back end, to be the same length.

In step S1010, FFT is performed on the original focus metric scan FM[1].

In step S1015, FFT is performed on the current focus metric scan FM[i].

In step S1020, the product of the transformed original focus metric scan FM[1] and the complex conjugate of the transformed current focus metric scan FM[i] is determined.

In step S1025, the inverse FFT of the result in step S1020 is determined.

In step S1030, an index location of xcorr[n] at which xcorr is maximum is determined.

In step S1035, a peak and two adjacent neighboring points are fitted to a parabola and maximum location of the parabola is determined corresponding to the maximum index of xcorr.

In step S1040, a delta Z(i) is determined as the difference between the maximum index of the xcorr and the length of n, where an xcorr with maximum value in a center indicates that there is no change in height from the original focus metric scan FM[1] and the current focus metric FM[i]. Alternatively, a positive value indicates a change in the positive direction.

For both methods described above with respect to FIGS. 9 and 10, to obtain sub sample resolution, a curve fitting method is used to find the peak of cross correlation. The maximum value and nearest neighbor to each side are used to fit the parabola, the peak of which indicates the best alignment.

Figure 11:
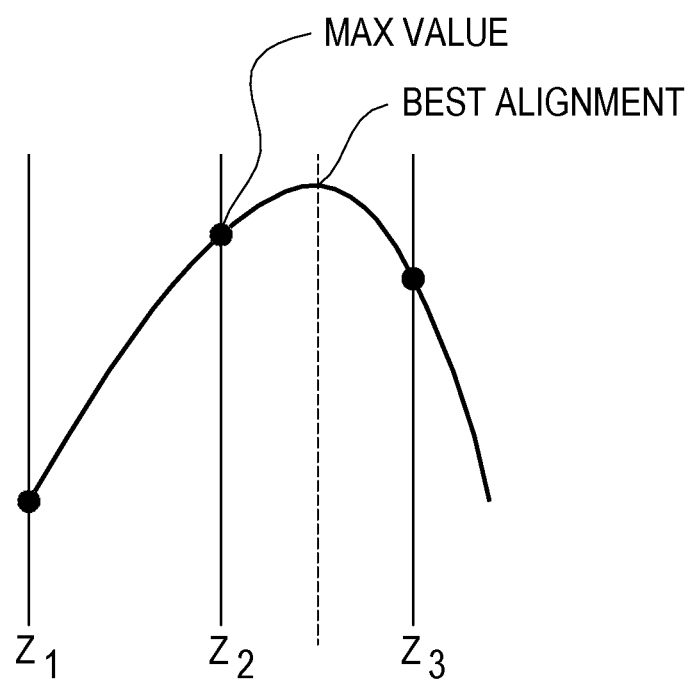
FIG. 11 illustrates a curve fitting method according to an embodiment of the present application.

The best alignment may be found between data points. Accordingly, good sub sample size alignment may be obtained without requiring an unreasonably large number of data points, as illustrated in FIG. 11.

The embodiments of the present application may be written as computer programs and can be implemented in general-use digital computers that store computer programs in memory or on computer readable medium and execute the programs using a processor or microprocessor. Examples of the computer readable recording medium include magnetic storage media (e.g., ROM, floppy disks, hard disks, etc.) and optical recording media (e.g., CD-ROMs, or DVDs).

While the embodiments have been particularly shown and described, it will be understood by those of ordinary skill in the art that various changes in form and details may be made therein without departing from the spirit and scope of the application as defined by the appended claims. The exemplary should be considered in a descriptive sense only and not for purposes of limitation. Therefore, the scope of the application is defined not by the detailed description of the embodiments but by the appended claims, and all differences within the scope will be construed as being included in the embodiments.

The invention claimed is:

1. A method of an automated microscopy system automatically focusing a microscope objective, the method comprising:

determining a focus position between the microscope objective and a reference microwell at a reference position on a microplate;

generating, by the automated microscopy system at a first time, an original focus metric scan of the reference microwell based on the focus position, the original focus metric scan comprising a first plurality of focus measure values of first images of the reference microwell respectively captured at a plurality of offsets in a direction of focus from the focus position, and each of the first plurality of focus measure values indicating a measurement of focus of a respective image among the first images;

storing the original focus metric scan in memory;

generating, by the automated microscopy system at a second time occurring after the first time, a current focus metric scan of a target microwell to be imaged on the microplate based on the focus position, the current focus metric scan comprising a second plurality of focus measure values of second images of the target microwell respectively captured at the plurality of offsets in the direction of focus from the focus position, and each of the second plurality of focus measure values indicating a measurement of focus of a respective image among the second images;

calculating, by the automated microscopy system, a cross correlation between the original focus metric scan and the current focus metric scan to determine an offset between the original focus metric scan and the current focus metric scan, wherein the focus position is moved to a position of the offset when the calculated cross correlation is low; and determining, by the automated microscopy system, a corrected focus position along the focus axis to image a sample in the target microwell to be imaged using the focus of the microscope objective that is offset from the focus position based on the offset between the original focus metric scan and the current focus metric scan.

2. The method of claim 1, wherein the original focus metric scan is represented by a first two-dimensional curve that indicates a first relationship between (i) the first plurality of focus measure values and (ii) the plurality of offsets, and wherein the current focus metric scan is represented by a second two-dimensional curve that indicates a second relationship between (i) the second plurality of focus measure values and (ii) the plurality of offsets.

3. The method of claim 2, wherein the cross correlation comprises a correlation between the first two-dimensional curve and the second two-dimensional curve.

4. The method of claim 3, wherein the correlation is an alignment of the first plurality of focus measure values captured at the offsets in the direction of focus to the second plurality of focus measure values captured at the offsets in the direction of focus.

5. The method of claim 4, wherein the determining the focus position comprises one of a user manually determining the focus position and the automated microscopy system automatically determining the focus position by performing a scan of images and selecting based on the scan of images a focus position of a best focused image as the focus position.

6. A method of an automated microscopy system automatically focusing a microscope objective, the method comprising:

determining a focus position between the microscope objective and a reference microwell at a reference position on a microplate;

generating, by the automated microscopy system at a first time, an original focus metric scan of the reference microwell based on the focus position, the original focus metric scan comprising a first plurality of focus measure values of first images of the reference microwell respectively captured at a plurality of offsets in a direction of focus from the focus position, and each of the first plurality of focus measure values indicating a measurement of focus of a respective image among the first images;

storing the original focus metric scan in memory;

generating, by the automated microscopy system at a second time occurring after the first time, a current focus metric scan of a target microwell to be imaged on the microplate, the current focus metric scan comprising a second plurality of focus measure values of second images of the target microwell respectively captured at the plurality of offsets in the direction of focus from the focus position, and each of the second plurality of focus measure values indicating a measurement of focus of a respective image among the second images;

calculating, by the automated microscopy system, a cross correlation between the original focus metric scan and the current focus metric scan to determine an offset between the original focus metric scan and the current focus metric scan, wherein the focus position is moved to a position of the offset when the calculated cross correlation is low; and determining, by the automated microscopy system, a corrected focus position along the focus axis to image a sample in the target microwell to be imaged using the focus of the microscope objective that is offset from the focus position based on the offset between the original focus metric scan and the current focus metric scan.

7. The method of claim 6, wherein the original focus metric scan is represented by a first two-dimensional curve that indicates a first relationship between (i) the first plurality of focus measure values and (ii) the plurality of offsets, and wherein the current focus metric scan is represented by a second two-dimensional curve that indicates a second relationship between (i) the second plurality of focus measure values and (ii) the plurality of offsets.

8. The method of claim 7, wherein the cross correlation comprises a correlation between the first two-dimensional curve and the second two-dimensional curve.

9. The method of claim 8, wherein the correlation is an alignment of the first plurality of focus measure values captured at the offsets in the direction of focus to the second plurality of focus measure values captured at the offsets in the direction of focus.

10. The method of claim 9, wherein the determining the focus position comprises one of a user manually determining the focus position and the automated microscopy system automatically determining the focus position by performing a scan of images and selecting based on the scan of images a focus position of a best focused image as the focus position.

* * * * *